US006473861B1

(12) United States Patent
Stokes (10) Patent No.: US 6,473,861 B1
(45) Date of Patent: Oct. 29, 2002

(54) MAGNETIC OPTICAL ENCRYPTION/DECRYPTION DISK DRIVE ARRANGEMENT

(75) Inventor: Richard A. Stokes, Rochester, NY (US)

(73) Assignee: Joseph Forte, Webster, NY (US)

( * ) Notice: Subject to any disclaimer, the term of this patent is extended or adjusted under 35 U.S.C. 154(b) by 0 days.

(21) Appl. No.: 09/204,243

(22) Filed: Dec. 3, 1998

(51) Int. Cl.$^7$ ................................................ H04L 9/00
(52) U.S. Cl. ...................................... 713/193; 713/194
(58) Field of Search .................... 380/194; 711/117; 713/194, 193

(56) References Cited

U.S. PATENT DOCUMENTS

| | | | | |
|---|---|---|---|---|
| 4,120,030 A | | 10/1978 | Johnstone .................... 364/200 |
| 4,168,396 A | | 9/1979 | Best ............................. 178/22 |
| 4,464,651 A | * | 8/1984 | Duhane ....................... 340/521 |
| 4,465,901 A | | 8/1984 | Best ........................ 178/22.08 |
| 4,525,599 A | * | 6/1985 | Curran et al. ............... 273/460 |
| 4,568,988 A | * | 2/1986 | McGinlay et al. ....... 360/77.02 |
| 4,573,119 A | | 2/1986 | Westheimer et al. ........ 364/200 |
| 4,634,807 A | * | 1/1987 | Chorley et al. ................ 380/4 |
| 4,680,731 A | * | 7/1987 | Izumi et al. .................. 365/52 |
| 4,691,350 A | | 9/1987 | Kleijne et al. ................. 380/3 |
| 4,785,361 A | | 11/1988 | Brotby et al. ................ 360/60 |
| 4,847,902 A | | 7/1989 | Hampson ...................... 380/4 |
| 4,849,927 A | * | 7/1989 | Vos |
| 4,860,351 A | | 8/1989 | Weingart ....................... 380/3 |
| 4,888,802 A | * | 12/1989 | Cooney ...................... 380/277 |
| 4,937,861 A | * | 6/1990 | Cummins ..................... 380/2 |
| 4,937,864 A | | 6/1990 | Caseiras et al. ................ 380/4 |
| 4,959,861 A | | 9/1990 | Howlette ........................ 380/4 |
| 5,012,514 A | | 4/1991 | Renton .......................... 380/4 |
| 5,081,675 A | | 1/1992 | Kittirutsunetorn ............. 380/4 |
| 5,095,525 A | | 3/1992 | Almgren et al. ............ 395/400 |
| 5,150,407 A | * | 9/1992 | Chan ............................. 380/4 |
| 5,150,465 A | * | 9/1992 | Bush .......................... 710/14 |
| 5,231,666 A | * | 7/1993 | Matyas ........................ 380/25 |
| 5,249,232 A | | 9/1993 | Erbes et al. .................. 380/49 |
| 5,257,149 A | * | 10/1993 | Meyer ..................... 380/78.14 |
| 5,267,311 A | * | 11/1993 | Bakhoum .................... 360/60 |

(List continued on next page.)

OTHER PUBLICATIONS

Blaze, Matt, "A Cryptographic File System for Unix", AT&T Bell Laboratories, 1993.*

Primary Examiner—Gilberto Barrón
Assistant Examiner—Douglas J. Meislahn
(74) Attorney, Agent, or Firm—Bernhard P. Molldrem, Jr.

(57) ABSTRACT

An encryption-decryption disk drive arrangement has a recordable disk and is configured so that data can be securely stored on the disk. The drive housing or enclosure is sealed, and any attempt to open the housing or to access the internal electronics will cause the encryption/decryption keys and firmware to be erased from EEPROMs in the drive. The drive can be configured so that data are encrypted and distributed between two disks, which can be a writeable CD ROM disk and a magnetic disk. With this disk drive arrangement, the encryption and decryption operations take place in the drive, and do not affect the motherboard or daughterboards of the associated computer. This arrangement can also be used to authenticating or verifying digitally stored documents and records.

11 Claims, 3 Drawing Sheets

U.S. PATENT DOCUMENTS

| | | | |
|---|---|---|---|
| 5,343,525 A | * 8/1994 | Hung et al. | 380/50 |
| 5,375,243 A | * 12/1994 | Parzych et al. | 395/725 |
| 5,467,396 A | * 11/1995 | Schossow et al. | 380/4 |
| 5,469,557 A | 11/1995 | Salt et al. | 395/425 |
| 5,483,596 A | * 1/1996 | Rosenow et al. | 380/25 |
| 5,513,262 A | 4/1996 | van Rumpt et al. | 380/29 |
| 5,515,540 A | * 5/1996 | Grider et al. | 395/750 |
| 5,563,945 A | 10/1996 | Gercekci | 380/4 |
| 5,677,952 A | 10/1997 | Blakley, III et al. | 380/4 |
| 5,697,519 A | * 12/1997 | Wittern et al. | 221/76 |
| 5,768,389 A | * 6/1998 | Ishii | 380/30 |
| 5,841,865 A | * 11/1998 | Sudia | 380/21 |
| 5,968,147 A | * 10/1999 | Polfer et al. | 710/52 |
| 5,999,622 A | * 12/1999 | Yasukawa et al. | 380/4 |
| 6,000,030 A | * 12/1999 | Steinberg et al. | 713/200 |
| 6,021,408 A | * 2/2000 | Ledain et al. | 707/8 |
| 6,052,780 A | * 4/2000 | Glover | 713/193 |
| 6,070,226 A | * 5/2000 | Freeman et al. | 711/117 |
| 6,249,866 B1 | * 6/2001 | Brundrett et al. | 713/165 |
| 6,272,637 B1 | * 8/2001 | Little et al. | 713/194 |

* cited by examiner

MAGNETIC OPTICAL ENCRYPTION/DECRYPTION DISK DRIVE ARRANGEMENT

BACKGROUND OF THE INVENTION

This invention relates to optical and magnetic disk memory devices, which can include self-validating data encryption hardware and software. The invention is more particularly concerned with a drive module in which the encryption keys are stored in the drive module, and which defeat attempts to compromise the keys or the protected data. Disk-type memory devices can be of any of several types, for example, write-once, and read-only thereafter, an example being a foil sandwich disk, into which bits are recorded by laser; and read/write as desired, either magneto/optic or erasable optical media. As the media are intended for more-or-less permanent storage, these are referred to as write-once, read-many-times optical disks.

There are many applications for encryption/decryption disk drives, including information security and electronic notarization, to name but two. There are a number of practical applications for such systems, including notarization of electronic documents, protection and authentication of legal records, government records, and academic records. For example, a company's personnel records can be electronically stored, including personal data, performance information, and work evaluations, all of which are sensitive and need to be protected from inspection or use by unauthorized persons. It is also required to be able to authenticate these records, as important hiring, promotion, and pay decisions need to be based on them. However, to date disk drives and similar storage media had to be accompanied with encryption key information, and the data could not be completely protected from experienced "hackers."

One attempt to provide data encryption is described in Kittirutsunetorn U.S. Pat. No. 5,081,675, in which a data storage device has its address space divided into data segments, and a programmable address scrambling device is employed, and where a prescribed address sequence is stored in another memory device. This system was created for internal computer architectures rather than for specific disk drives. The appropriate one of several scrambling keys has to be supplied to the programmable address scrambling device in order to retrieve a particular decrypted data word. The Kittirutsunetorn arrangement employs a single integrated circuit and requires random access memory units, or RAMUs, which are critical to the address and data scrambling systems. Address and text data are randomly scrambled by a Programmable Address Scrambling Device, or PASD, and these data are randomly stored, and accessed in memory. The Kittirutsunetom system is interposed between the address port of the data storing device and the data system address buss, scrambles data, and employs completely different hardware and software to accomplish that process. The system microprocessor, system ROM, DRAM, hard drive, address busses and data busses are required for support of the address and data scrambling system. This system does not work satisfactorily for the applications mentioned above, as it scrambles, rather than transforms, the system address and or text data. Also, the Kittirutsunetom system does not locate the microprocessor, ROM keys, ROM firmware, or DRAM registers for encryption and decryption within a sealed and guarded disk or other drive, and provides no real protection from access to the inside of the system, as the hardware and firmware are not all located within the disk drive. Also, there is no means for automatically erasing or deleting encryption key codes in the event an unauthorized person accesses the interior of the disk drive assembly.

OBJECTS AND SUMMARY OF THE INVENTION

Accordingly, it is an object of the present invention to provide circuitry or hardware for protecting stored data that avoids the drawbacks of the prior art.

It is another object to provide a disk storage system in which encryption and decryption keys are stored in a circuit element separate from the data storage disk, and which defeats hacking or access by unauthorized persons.

It is a further object to provide an optical or magnetic-optical encryption/decryption system that is contained in a housing that encloses all the required circuit modules so that the system is self-contained.

In accordance with an aspect of the present invention, an optical encryption/decryption disk drive arrangement has a write-once, read-many-times optical drive of the type that has a recordable optical disk with an address region of track and sector addresses and a region of data tracks adapted for storing encrypted data. The drive has one or more read/write heads and a positioning servo for positioning the read/write head(s) relative to the disk. There is a motor for rotating the disk. An encoded data buffer is coupled to the read/write head and an encryption-decryption module is coupled to this buffer for encrypting data to be stored in the data tracks and addresses to be stored in the address region; and also for decrypting data and addresses read from the buffer. An erasable memory device is coupled to the encryption-decryption module and stores encryption keys for encrypting the data and addresses that are transferred to the encrypted data buffer. The encryption keys are also used for decrypting the data and addresses transferred from the encrypted data buffer. A data buss includes decrypted data input and output paths and is coupled to the encryption-decryption module, so that the data buss conveys decrypted data to and from further processing modules, i.e., processing hardware within the remaining parts of the associated computer. A housing contains the drive, the encrypted data buffer, the encryption-decryption module, the data buss, and the erasable memory device; and there is one or more protective device for disabling the drive motor and positioning servo and for erasing the encryption keys stored in said erasable memory device in the event of an unauthorized access into the housing. A data register or equivalent device can be connected with the data buss as an unauthorized-attempt memory register for counting unauthorized attempts to access the stored data.

According to another aspect of this invention, a magnetic optical dual disk drive arrangement has an optical drive and a separate magnetic drive, such as a hard disk drive. The optical drive can be a write-only, read-many-times CD ROM drive of the type in which a recordable optical disk has data tracks adapted for storing encrypted data, and tracks for storing encrypted track and sector data. The drive has one or more optical read/write heads, a positioning servo for positioning the optical heads, and a motor for rotating the optical disk. The magnetic disk drive includes a magnetic storage disk, one or more magnetic read/write heads, a positioning mechanism for positioning the magnetic head, and a motor for rotating the magnetic disk. A data encrypting and formatting module is coupled to the optical head for encrypting data to be written onto the optical disk and decrypting data picked up by the optical head. This module is also coupled to the magnetic head for encrypting data to be recorded by the magnetic head. A data buss coupled to the data encryption and formatting module conveys decrypted data to and from further processing modules, e.g., the processor of the associated computer. An erasable memory device is coupled to the data encryption and formatting module and is adapted for storing encryption keys for encrypting and decrypting data and format information stored on the optical and magnetic disks. A drive housing contains the optical and magnetic drives, the data encryption and formatting module, and the erasable memory device, and a protective mechanism automatically erases the encryption keys stored in the erasable memory device in the event of an unauthorized opening or accessing the drive housing. In a variation of this arrangement, a microprocessor can be coupled to the formatting buffer and to the encrypt/decrypt module of the data formatting buffer, and can be configured for subtractive data filtering or for additive data filtering.

The above and many other objects, features, and advantages of this invention will become apparent from the ensuing description of selected preferred embodiments, the description being considered in connection with the accompanying Drawing.

DETAILED DESCRIPTION OF THE PREFERRED EMBODIMENT

Figure 1:
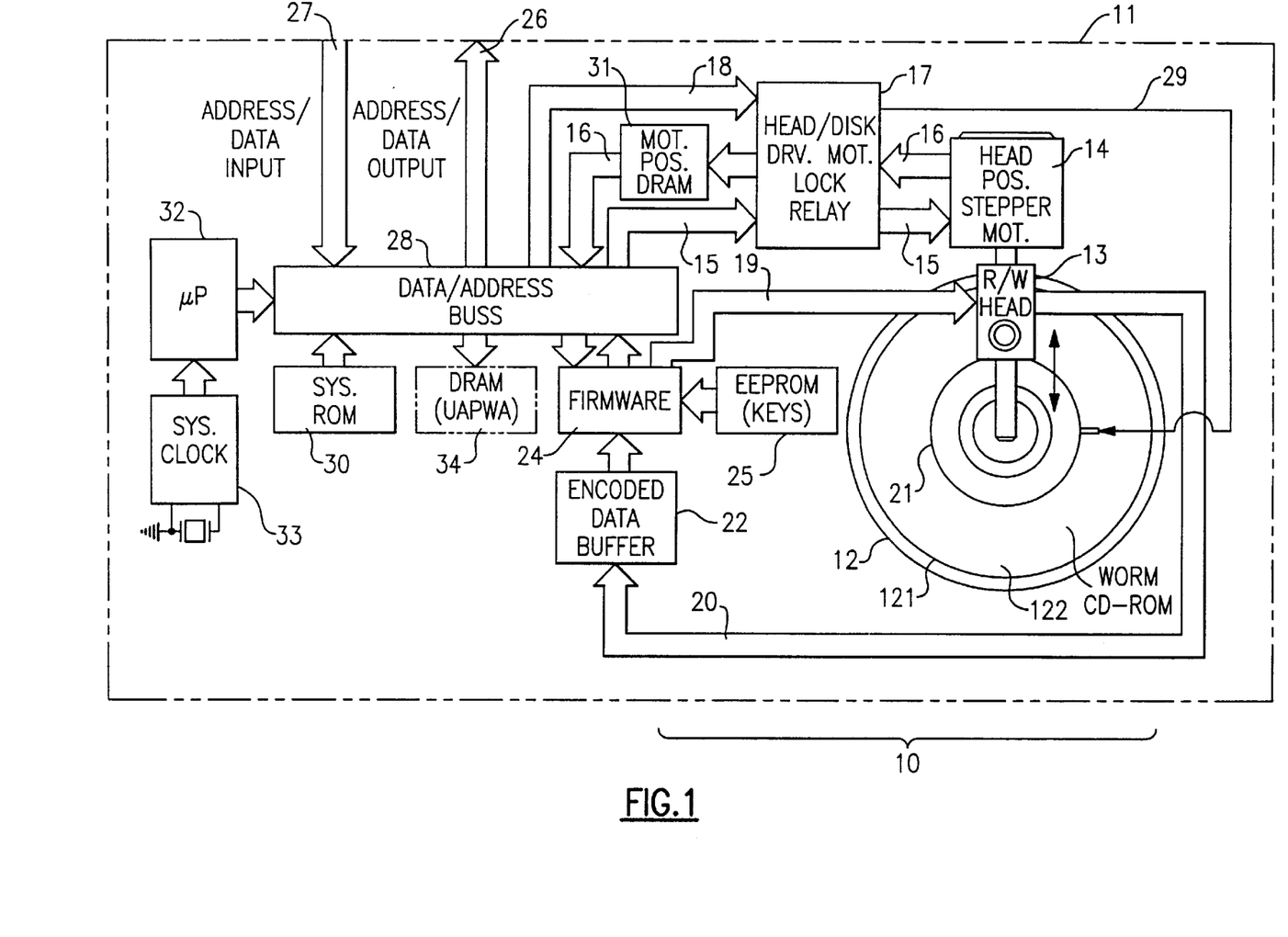
FIG. 1 is a schematic circuit view of an optical drive arrangement according to one preferred embodiment of the invention.

With reference to the Drawing, FIG. 1 illustrates a data encryption/decryption device and technique that employs the principles of this invention, and which is an advance over the current state of the art.

Present data encryption/decryption devices and techniques commonly utilize two or more of the processing and storage devices contained within the host computer's internal architecture and/or peripherals. These elements include the CPU, ROM, RAM, hard disk drive, floppy disk drive, optical disk drive, and a data-and-address buss are used to run the encryption/decryption program. The primary difficulty with this arrangement is that an unauthorized person, i.e., a hacker, may open the enclosure and, by any of a variety of techniques, can read data from critical areas, such as from the microprocessor, the storage site for the encryption/decryption firmware program (usually located in a ROM), the encryption keys for the program, and/or the hard disk drive.

Because several encryption programs transform address and/or text and bit-mapped data, the operation time necessary to perform data transformation operations slows down the processing speed of the internal architecture. Therefore, an important object of the present invention is that internal data processing speed should not be affected by the encryption/decryption mechanism. It is also an objective of this invention that the disk drive should perform encryption and decryption operations "off-line", i.e., in the disk drive, rather than in the processor. Because the encryption drive is off line, the combined disk drive and encryption/decryption arrangement can be sold and installed as an after-market accessory, and does not affect the internal motherboard architecture of the associated computer. That is, with this system, it is not required to upgrade the computer internal architecture in the form of new motherboard or daughterboards, and does not consume expansion slots of the existing motherboard. The input and output between the computer and the disk drive is unencrypted or in-the-clear, and does not provide any means for analyzing the encryption codes or keys.

In the embodiments of this invention, the disk drive stores encryption keys and encryption/decryption firmware in a secured environment. Any attempt to open the disk drive enclosure or housing will result in a loss, i.e., erasure, of stored encryption key material. In one embodiment, the EEPROM storing the encryption keys is electrically erased when the enclosure is opened or penetrated. In other embodiments, the encryption keys can be stored on a RAM, which loses memory when the enclosure is opened. This invention is directed to the hardware aspects of this arrangement, and can employ any of a number of suitable encryption programs and keys. Encryption/decryption keys and programs are discussed in a later section.

In the embodiment, a single-disk disk-drive assembly 10 is shown with an enclosure or housing 11 represented by a chain line. Here, a write-once CD ROM 12 is the data storage medium, which contains sector and track address data in sector and track storage area 121 and data tracks in a data storage area 122. A laser-based optical read/write head 13 is positioned by means of a head position stepper motor 14 that is controlled by data supplied over a head position data channel 15. Position feedback may be carried out in a head position sensor circuit 16, which is optional. The channel 15 and circuit 16 connect with a head and disk motor lock relay circuit 17. This circuit acts to disable the head positioning stepper motor 14 and a disk drive motor 21 for the disk 12, in the event that incorrect encryption, data structure, track and sector structure, bit-map "pass images" or A-N Pass-Word Key entry is detected. In such event, a binary motor lock/relay activation signal is provided over a motor lock relay activation circuit 18. When this condition occurs, the disk drive 10 locks up, and has to be reset by entering a RESET address code, which is known only to trusted personnel, i.e., system administrators.

A write channel 19 carries encrypted write disk addresses and data for storage to the read/write head 13, and a read channel 20 carries disk address and data that is picked up by the head 13. A disk data buffer 22 receives the encrypted read-out data from the read channel 20, and supplies same to an encryption/decryption ROM module 24. An EEPROM 25 contains passwords and data signature look-up tables, as well as encryption keys, and is connected to the encryption/decryption ROM module 24.

An address and data output channel 26 and an address and data input channel 27 communicate unencrypted data between a data and address buss 28 and further computer modules, e.g., to the motherboard of the host computer (not shown). The buss 28 is also connected with the encryption/decryption ROM module 24, as well as with a system ROM 30, and with the head position sensor circuit 16, the head position data channel 15, and the head and disk motor lock relay circuit 17. The write channel 19 connects from the encryption/decryption ROM module 23 to the head 13. A motor position DRAM register 31 is shown here installed on the head position sensor circuit 16, but may alternatively be installed on the head position data channel 15.

A system microprocessor 32 is also shown coupled to the data and address buss 28, and has an associated system clock 33. A drive motor electrical channel 29 is shown here between the head and disk motor lock relay circuit 17 and the DC-ROM drive motor 21.

In this embodiment, the track and sector addresses and the data tracks are read from the CD ROM 12 by the head 13, and are transferred to the encrypted data buffer 22. The encryption/decryption ROM module 24 reads the encrypted data from the buffer 22 and decrypts both disk address data and the data storage tracks, using the encryption keys in the EEPROM 25. The EEPROM can store complex encryption keys that are buried in a digital data stream. The keys can be entered from a smart card or a hand held terminal that is in the possession of a limited number of trusted personnel. The EEPROM 25 can also hold passwords, PINs, bit-mapped "pass-images", pass-phrases, data structure keys, and track and sector encryption keys to operate the firmware contained in the ROM module 24.

The head 13 is positioned by the stepper motor 14 which acts by means of the motor position DRAM register 31. The data and address buss 28 receives address/data blocks from the host computer over the input channel 27. The system ROM 30 stores system operation firmware. The microprocessor 32 and system clock 33 manage the system data input and output (I/O), and the microprocessor 32 compares address commands from the input channel 27 to decoded track and sector address data from the CD ROM 12 and motor position data in the register 31. Decrypted data from the data tracks 122 are transferred to the host computer over the address and data output channel 26.

If encryption, data structure, track and sector structure, bit map pass images, or alphanumeric password key entry is detected to be incorrect, the system will disable the disk drive motor 21 and the head positioning stepper motor 14 by opening the head and disk motor lock relay 17. When this condition occurs, the disk drive arrangement 10 will remain inoperative until it is reset. This can be done by entry of a RESET address code, which is possessed only by a limited number of system administrators.

Because the encryption keys are not stored on the CD ROM disk 12, or in any storage devices located in the host computer architecture, the same may not be analyzed or defeated. The data from the host computer can be unencrypted, or can be encrypted, in which case a second level of encryption will be realized when the data is written onto the disk 12.

As an option, a DRAM 34 can be coupled with the data and address buss 28 to record unauthorized password attempts as well as the time and date of each attempt.

The system described here relates to recordable optical media, but the principles of the invention apply also to magnetic and optical/magnetic disk media. The chief disadvantage of magnetic media is that magnetic media may become degraded with age or upon exposure to magnetic fields. On the other hand, magnetic media may also be erased and rewritten if the encryption keys are compromised. In the case of a magnetic disk storage arrangement, the laser diode head 13 would be replaced with a magnetic recording head.

It is also possible to employ both a recordable optical disk media and a magnetic storage media, and examples of these are described in respect to the embodiments that follow.

Figure 2:
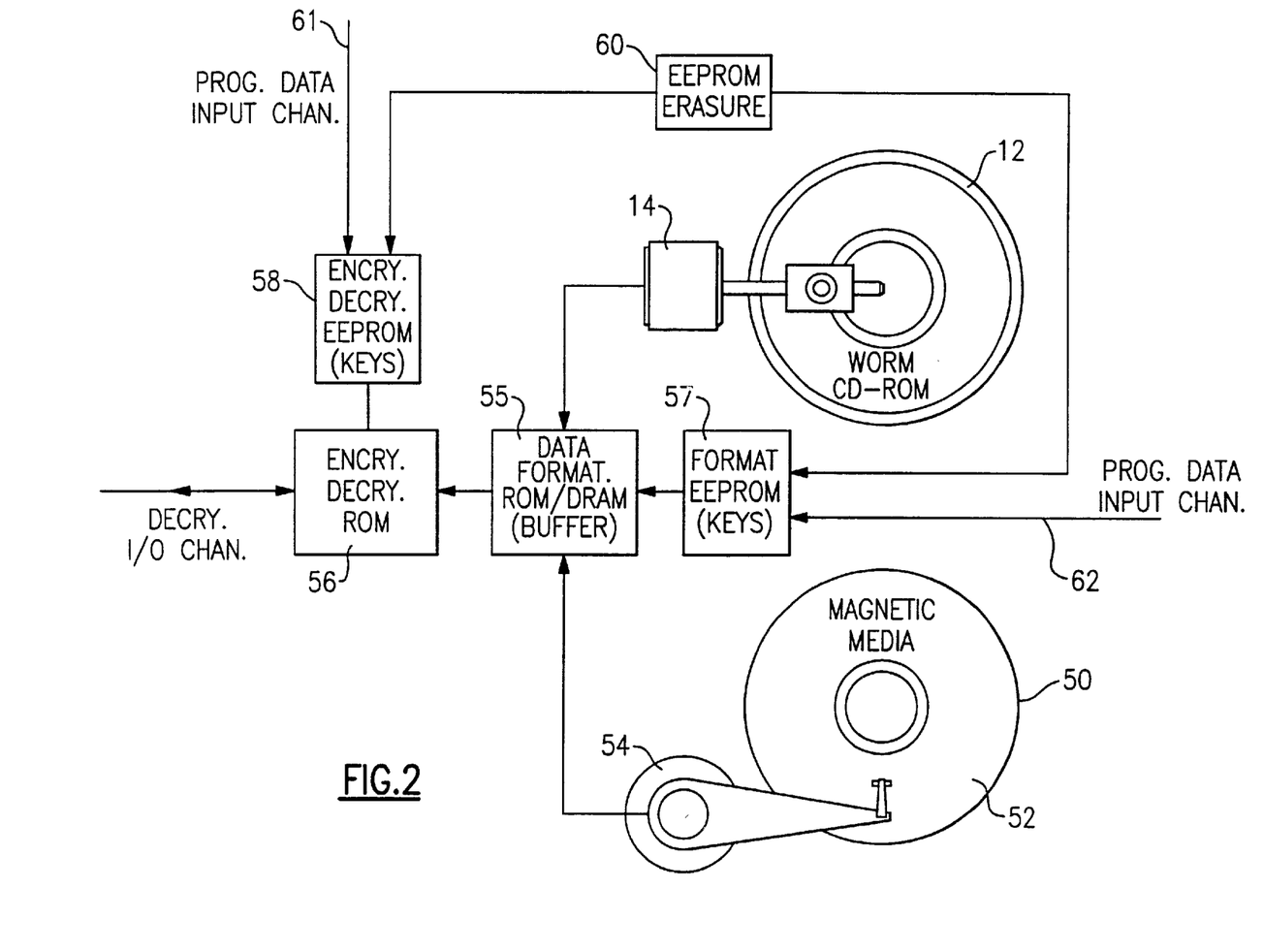
FIG. 2 is a schematic circuit view of a magnetic-optical drive arrangement according to another preferred embodiment of the invention.

The optical/magnetic disk drive illustrated in FIG. 2 enables magnetic and optical disks to be encrypted in an enclosed and secured environment. The dual drive incorporates the features of the single-disk embodiment (i.e., FIG. 1), but includes additional features. Many of the features, which are present in a practical implementation, have been omitted from this view for the sake of simplicity, but would be the same or similar to what is shown in FIG. 1.

In this case, in addition to the write-once CD ROM 12, which is shown with its associated read/write head 13 and stepper motor 14, there is a magnetic storage medium 50 including a magnetic disk 52, with a magnetic read/write head 53 carried on an arm that is moved by a servo or stepper motor 54. A data formatting ROM and DRAM 55 has I/O ports that connect to the read/write heads 13 and 53, respectively. The ROM/DRAM 55 is coupled to an encryption/decryption ROM 56, and is also coupled to a format EEPROM 57. An encryption/decryption EEPROM 58 is coupled to the ROM 56. The ROM 56 decrypts the formatted data from the DRAM/ROM 55. A decrypted I/O channel 59 connects the ROM 56 with further elements, such as the data/address buss 28 (FIG. 1). An EEPROM erasure device 60 is coupled to inputs of the EEPROMs 57 and 58, respectively, and automatically erases the keys stored in these EEPROMs in the event that the enclosure is physically opened, or it a user fails to enter a valid service code. The EEPROMs are also shown with EEPROM program data input channels 61 and 62 whereby an authorized person can enter the key material, for example using a smart card or a protected coding device.

Any attempt to open the disk package, and to read data stored in the formatting ROM/DRAM 55 or in the EEPROM keys 57, 58, will cause the EEPROM keys to be erased, rendering the firmware in the ROMs 55 and 56 to become functionally inoperable. The keys can then only be restored by authorized service personnel.

The optical disk 12 is a write-once, read many times (WORM) optical disk, or alternatively is a magnetic optical disk, and serves here as the primary storage medium. The magnetic disk 52, which can be a fixed hard disk or a removable hard or floppy disk, serves as the secondary storage medium.

During a read operation, the heads 13 and 53 read data from the disks 12 and 52, and transfer data to a buffer DRAM, which is packaged with the format ROM 55. The firmware in ROM 55 determines the location and order of reading and writing data tracks. Assembled (i.e., completed) files are not stored in this system. Instead, a multiplicity of encrypted address and text data are distributed around the magnetic or optical disks in a random order which is assembled by the DRAM/ROM 55 into completed files. This technique is the heart of this encryption system. The DRAM/ROM 55 also may contain, as a user option, a program which distributes data between disks 12 and 52, thereby adding a further layer of security. This can be important where one of the disks is removable. In the READ operation, the DRAM/ROM assembles the data into the proper sequence from the two disks 12, 52.

The encryption/decryption ROM 56 decrypts the formatted data from the DRAM/ROM 55. The EEPROM keys 57 and 58 store alphanumeric and bitmap keys in look-up tables, and also store system passwords. The EEPROMs 56 and 57 will be erased by the EEPROM erasure device 60 if, e.g., an invalid access code or PIN is entered, allowing for some number of attempts, or where an opening of the case or enclosure is detected. The device 60 can operate a micro-wire bridge, or can break a circuit which a conductive fastener completes, and then releases both an erasure current from a battery and a capacitor charge, thereby providing redundant erasure to the EEPROMs.

The WRITE function is the opposite of the READ function, carried out in a corresponding fashion.

Figure 3:
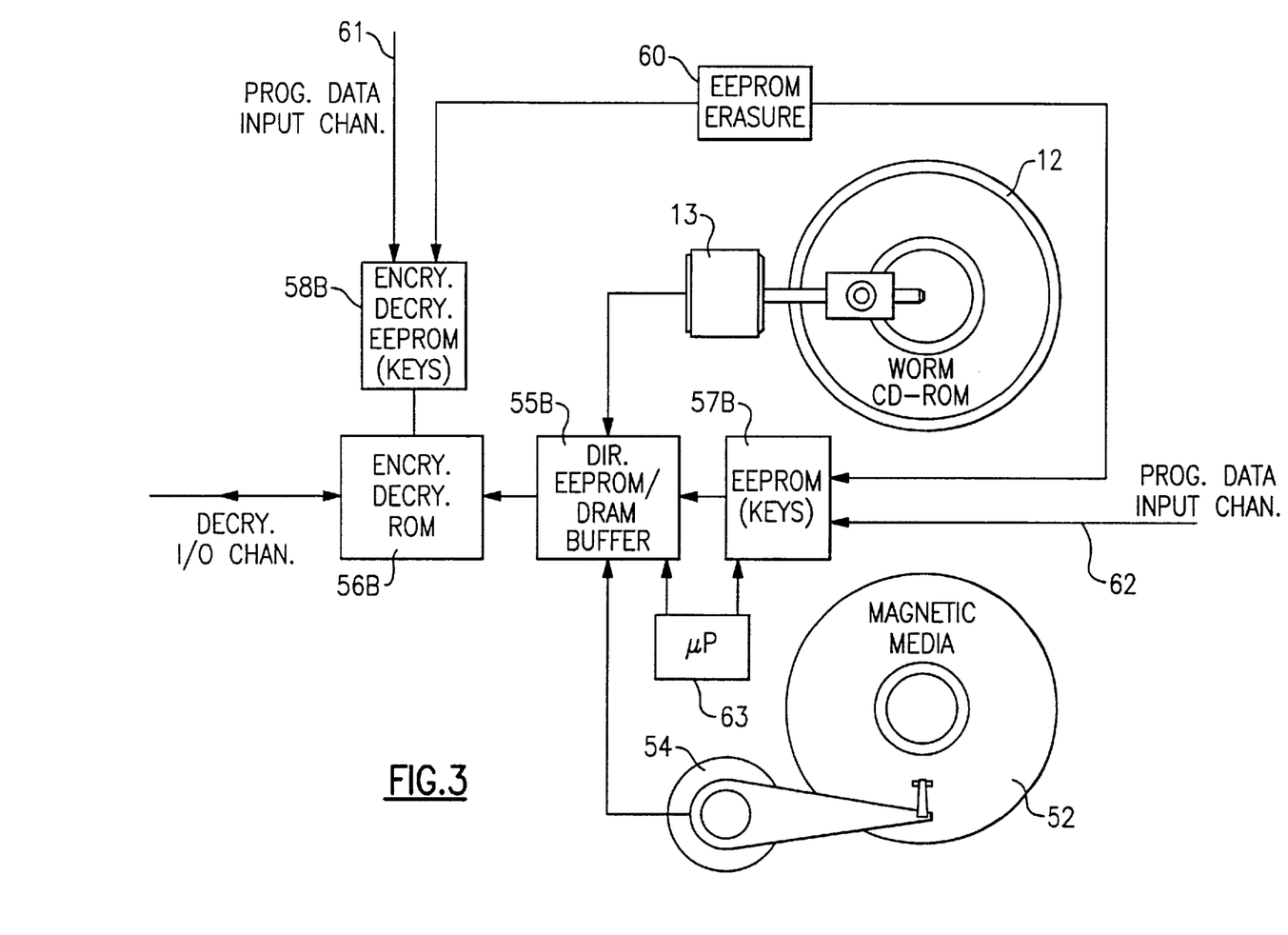
FIG. 3 is a schematic circuit view of an magnetic-optical drive arrangement according to yet another preferred embodiment of the invention.

FIG. 3 shows an alternative arrangement to the FIG. 2 embodiment, in which the same reference numbers are used to identify similar elements. Here is an identity code embedded in each of the disks 12 and 52, and there is no resident directory on either of the two disks. Rather, the directory is encrypted and is stored in an EEPROM within the ROM/DRAM 55B, which provides a disk buffer, and stores the directory contents. A microprocessor 63 compares and matches disk identity codes to their directory contents. The EEPROM 57B stores alphanumeric and bitmap keys as well as service and personal passwords. Also, the EEPROMs 55B, 57B and 58B can be erased by means of the EEPROM erasure device 60 in the event of tampering or attempted unauthorized access.

Removing the directory data from the disk medium ensures that the disk has an extra layer of security in both its storage medium and in the security device, as well as locating the directory information off-disk. In addition, the data stored in the directory is immediately available to the host computer without the need to read and upload disk data. This feature requires a disk ID number to be applied to the disk label in memory.

An optical/magnetic disk drive can be configured similar to what is illustrated in FIG. 3, which employs subtractive data filtering for the disks 12 and 52. In this configuration, there are specific alphanumeric codes and bitmap data patterns and codes hidden in the encrypted test. All data from the disk bit streams are deposited in the DRAM buffer 55B, and the data are compared by the microprocessor 63. If the data embedded in the disk bit stream are validated, the encryption/decryption ROM 56B will decrypt the data from the buffer 55B. If validation is not present the data are not decrypted, and the heads and disk motors lock up. These can be unlocked later by a coded entry from a system administrator. The EEPROM 58 provides data reference keys for the ROM 56B. The EEPROMs can be erased in the event of tampering or entry of incorrect access codes.

This arrangement can also be configured for the use of additive data filtering, which is similar to that described, but serves to complete encrypted text. Here, the system looks for specific alphanumeric and bitmap data patterns and codes which are hidden in the encrypted text. When specific data embedded in the disk bit stream is detected, data stored in the DRAM 55B is inserted into the bit stream in order to complete the encrypted text. If the specified data are not detected, then the head and disk drive motors and head positioners will lock up.

In some alternative embodiments, RAM keys can be substituted for the EEPROM keys 57 and 58. An EEPROM can be used in place of the encryption/decryption ROM 56. The RAM keys have the advantage of being reprogrammable in very short cycles. Thus the programming can be momentary, as the RAMs can be programmed and then erased. This feature permits the system to be programmed either from a single central source or from a multiplicity of sources. Here, disks can store encrypted data which are decrypted by data keys stored in the RAMs. The advantage of using an EEPROM in place of the encryption/decryption ROM is that the EEPROM may be erased, along with the RAM data keys, by the erasure unit 60. All the data from the disk bit streams are deposited in the DRAM buffer of element 55B, and then the data are compared in the microprocessor 63. If the data embedded in the disk bit stream are validated, then the data in the buffer will be decrypted.

Otherwise, the system will lock, as discussed before. In the case where RAMs are employed, the erasure device 60 can also supply battery current to the RAMs to maintain their memory states when the system is powered down, as well as supplying erasure current, as needed, to the encryption/decryption EEPROM.

With the magnetic-optical disk drive (MODD) arrangement of this invention, all hardware and firmware are located within the disk drive housing, and so full control is assured over who may access the data inside. No data probes may be inserted to read the encrypted data at the microprocessor, ROM firmware, ROM key, peripheral port, or connecting cable. The MODD requires full access rights, although the means and methods of user access and identification can vary. If the user is unable to demonstrate authorization, access will be denied. User access may include one or more of the following techniques or devices (this list is not exhaustive):

1. A system pass-word coupled to a MODD-specific password, or a series of MODD-specific pass-words (by keyboard entry);
2. Real-time bit map point verification (face-print, fingerprint, or retinal print);
3. Digital voice/phrase recognition prints;
4. Pre-printed bit maps (logos, face prints, retinal prints, finger prints);
5. Text-point recognition;
6. Text-pattern recognition;
   (These last two devices may depend on proprietary scanned-in text which has points or patterns which are correspondingly embedded in the EEPROM key. The exact text must be scanned-in every time the encrypted data require access.)
7. Automated digital key entry from a hand-held terminal or smart-card (a very long and complex key is possible using this technique);
8. Digitized bit map entry (face, voice, retinal, fingerprint, logo, or any other print map, e.g., a digitized Mona Lisa) entered from a hand-held terminal, smart card, or similar device. In the instance of bit-mapped access keys, either selected points or the complete bit map may constitute the key;
9. Blank "windows" or "labels" scattered throughout the text into which individually-entered pass phrases or bit maps may be entered. This technique customizes "universal" software and storage disks for use in a single (secured) disk drive only;
10. Existing disks which do not have these "windows" or "labels" may still be individually customized for a disk drive by placing a numerical I.D. sticker on them. A pass phrase, pass number, or bit-map key may then be written into the EEPROM key which is associated with that disk's sticker number; and
11. Bar-code scanner coded pass data.

There are four conditions which require access, and three system responses:

1. User access—Improper I.D. causes disk drive and head positioning motors to lock up.
2. Improper code detection (embedded in data stream)—Disk drive and head positioning motors lock up.
3. Service access codes embedded in a bit stream from a service terminal—Improper data codes will erase the EEPROM or RAM data keys.
4. Tampering—Any attempt to open the housing and insert a data probe results in EEPROM or DRAM key erasure, and firmware EEPROM erasure.

Because all system encryption and drive hardware is internal and inclusive to the same housing (and thereby independent of the system CPU and firmware devices) the MODD may be defined as a true peripheral storage device. Because it is or may be considered as an accessory, there is no need for any internal changes to the host computer architecture, that is no changes are needed to adapt to the host computer motherboard or daughterboards. Likewise, there is no need for after-market alterations to the host motherboard or daughterboards. Only a small price is paid, in terms of storage and retrieval times, because the data transformation process is carried out in the peripheral storage device, and not in the host computer. Thus, the MODD of this invention does not significantly affect disk storage and retrieval times, as compared with encryption systems that require data processing by the host computer CPU, RAM, ROM and its other storage devices.

All transformation algorithms are representative of Level 2 security applications. These include business and consumer PC software and data storage protection. Level 1 security applications employ more tightly-controlled encryption algorithms, firmware programs, identification devices, and maintenance levels. Level 1 security can be achieved using two or more of the techniques described hereinabove.

There are any number of general and commercial applications for documents requiring limited access and security for which the MODD of this invention will provide an excellent match. These can be self-registering legal documents, such as pre-nuptial and matrimonial agreements, real estate and vehicle ownership transfers, business partnerships, personal contracts, and rental agreements. These can have government application as well, at the local level (city or village, county, state), and can include formatting information. These can also be used for birth, death, and marriage records, shared with hospitals and government entities. Other applications are personnel and employment records, bank and loan contracts, service contracts such as appliance or automotive warranty repairs, medical and dental records, police and law enforcement data, and court and legal papers such as wills, trusts, and contracts.

The MODD can be used with permanent-entry media, e.g., write once, read only thereafter disks, to serve as notary public stamps, medical stamps, legal stamps, academic institution stamps, government stamps (civil or military), or private business stamps as a means of authenticating the data on the disk. In these cases, the stamp can take the form of graphics that is printed out with the associated documents when needed to verify their authenticity.

Unlike the prior art, such as in U.S. Pat. No. 5,081,675, the arrangement of the present invention does not depend on the internal architecture of the host computer to perform encryption operations. The MODD encryption system transforms, through a series of operations, unencrypted system address, text, or bit-mapped data to encrypted data for storage onto an optical or magnetic disk medium. The system demonstrated in U.S. Pat. No. 5,081,675 scambles data, and employs a completely different hardware and software design to accomplish that process.

As mentioned before, this invention is concerned with the hardware aspects of the MODD arrangements. The encryption algorithm can take any of a wide variety of forms. The validity of the encryption structure can be checked in several ways, such as page layout grid, or line and column validity within a bit map area. Address and data check codes may be embedded within the data and address tracks. Encodement algorithms may include skip codes, mathematical formulas, key codes, or other techniques, with the complexity of the code being selected according to the desired security level. Non-proprietary code and keying systems may be preferred.

While the invention has been described hereinabove with reference to a few preferred embodiments, it should be recognized that the invention is not limited to those precise embodiments. Rather, many modification and variations would present themselves to persons skilled in the art without departing from the scope and spirit of this invention, as defined in the appended claims.

I claim:

1. An encryption/decryption peripheral disk drive arrangement for use in a data processing device, and for communicating with processing equipment outside the disk drive arrangement and within the data processing device, the encryption/decryption disk drive arrangement recording and storing data in encrypted form but receive data from the outside processing equipment in unencrypted form and sending the data to the outside processing equipment in decrypted form, such that communications between the disk drive arrangement and the outside processing equipment are transparent and independent of any encryption within the disk drive arrangement, but also such that the data recorded on the disk drive are secured against unauthorized access within the disk drive arrangement, the disk drive arrangement comprising:

(a) a recordable disk drive including a removable recordable data storage disk having an address region of track and sector addresses and a region of data tracks adapted for storing encrypted data; at least one read/write head; positioning means for positioning said read/write head relative to said disk; and a motor for rotating said disk;

(b) an encoded data buffer coupled to said read/write head;

(c) an encryption-decryption module that is coupled to said buffer for encrypting data to be stored in said data tracks and addresses to be stored in said address region; and for decrypting data and addresses read from said buffer;

(d) erasable memory device coupled to said encryption-decryption module and storing encryption keys for encrypting the data and addresses transferred to said encrypted data buffer and for decrypting the data and addresses transferred from said encrypted data buffer;

(e) a data buss having decrypted data input and output means coupled to said encryption-decryption module for conveying decrypted data to and from further processing modules;

(f) a disk drive housing containing said drive, said encrypted data buffer, said encryption-decryption module, and said erasable memory device, said data buss having input and output means extending from inside to outside said disk drive housing for communicating decrypted data with said further processing modules of said data processing device; and (g) protective means for disabling said drive motor and positioning means and for erasing the encryption keys stored in said erasable memory device in the event of an unauthorized access into said disk drive housing.

2. Optical encryption/decryption peripheral disk drive arrangement for use in a data processing device, and for communicating with processing equipment outside the disk drive arrangement and within the data processing device, the optical encryption/decryption disk drive arrangement recording and storing data in encrypted form but receiving data from the outside processing equipment in unencrypted form and sending the data to the outside processing equipment in decrypted form, such that communications between the disk drive arrangement and the outside processing equipment are transparent and independent of any encryption within the disk drive arrangement, but also such that the data recorded on the disk drive are secured against unauthorized access within the disk drive arrangement, the disk drive arrangement comprising:

(a) a write-once, read-many-times optical drive including a removable recordable optical disk having an address region of track and sector addresses and a region of data tracks adapted for storing encrypted data; at least one read/write head; positioning means for positioning said read/write head relative to said disk; and a motor for rotating said disk;

(b) an encoded data buffer coupled to said read/write head;

(c) an encryption-decryption module that is coupled to said buffer for encrypting data to be stored in said data tracks and addresses to be stored in said address region; and for decrypting data and addresses read from said buffer;

(d) erasable memory device coupled to said encryption-decryption module and storing encryption keys for encrypting the data and addresses transferred to said encrypted data buffer and for decrypting the data and addresses transferred from said encrypted data buffer;

(e) a data buss having decrypted data input and output means coupled to said encryption-decryption module for conveying decrypted data to and from further processing modules;

(f) a disk drive housing containing said drive, said encrypted data buffer, said encryption-decryption module, and said erasable memory device, said data buss having input and output means extending from inside to outside said disk drive housing for communicating decrypted data with said further processing modules of said data processing device; and (g) protective means for disabling said drive motor and positioning means and for erasing the encryption keys stored in said erasable memory device in the event of an unauthorized access into said disk drive housing.

3. Optical encryption/decryption disk drive arrangement according to claim 2, wherein said encryption-decryption module includes a ROM.

4. Optical encryption/decryption disk drive arrangement according to claim 2, wherein said erasable memory device includes an EEPROM.

5. Optical encryption/decryption disk drive arrangement according to claim 2, further including a head disk motor lock coupled to said drive motor, said head positioning means, and said data buss, and including a head position memory unit for positioning said read/write head in accordance with decrypted address data from said data buss.

6. Optical encryption/decryption disk drive arrangement according to claim 2, further comprising an unauthorized-attempt memory register coupled with said data buss for counting unauthorized attempts to access the data stored on said disk.

7. Magnetic optical dual disk peripheral disk drive arrangement for use in a data processing device, and for communicating with processing equipment outside the disk drive arrangement and within the data processing device, the magnetic optical dual disk drive arrangement recording and storing data in encrypted form but receiving data from the outside processing equipment in unencrypted form and sending the data to the outside processing equipment in decrypted form such that communications between the disk drive arrangement and the outside processing equipment are transparent and independent of any encryption within the disk drive arrangement, but also such that the data recorded on the dual disk drive arrangement are secured against unauthorized access within the dual disk drive arrangement, the dual disk drive arrangement comprising:

(a) write-only, read-many-times CD ROM drive including a removable recordable optical disk having data tracks adapted for storing encrypted data and encrypted track and sector data, and at least one optical read/write head; positioning means for positioning said optical head; and a motor for rotating said optical disk;

(b) a magnetic disk drive including a magnetic storage disk; a magnetic read/write head; positioning means for positioning said magnetic head; and motor means for rotating said magnetic disk;

(c) a data encrypting and formatting module including means coupled to said optical head for encrypting data to be stored in said optical disk and decrypting data to be recorded by said magnetic head;

(d) data buss means coupled to said data encryption and formatting module for conveying decrypted data to and from further processing modules;

(e) erasable memory means coupled to said data encryption and formatting module and adapted for storing encryption keys for encrypting and decrypting data and encrypting and decrypting format information that are stored on said optical and magnetic disks;

(f) a dual disk drive housing containing said optical and magnetic drives, said data encryption and formatting module, and said erasable memory means, said data buss having input and output means extending from inside to outside said dual disk drive housing for communicating decrypted data with said further processing modules of said data processing device; and (g) protective means for automatically erasing the encryption keys stored in said erasable memory means in the event of an unauthorized opening or accessing said dual disk drive housing.

8. Magnetic optical dual disk drive according to claim 7, wherein said data encryption and formatting buffer module includes a data formatting buffer having input-output means coupled to said optical head and said magnetic head, and an encrypt/decrypt module coupled to said data formatting buffer and to said data buss means.

9. Magnetic optical dual disk drive according to claim 8, wherein said erasable memory means includes a format EEPROM coupled to said data formatting buffer and an encryption/decryption EEPROM coupled to said encrypt/decrypt module.

10. Magnetic optical dual disk drive according to claim 9, wherein said protective means includes an EEPROM erasure device having respective erase signal carrying means connected to erase inputs of said format EEPROM and said encryption/decryption EEPROM.

11. Magnetic optical dual disk drive according to claim 8, further comprising a microprocessor coupled to said formatting buffer and to said encrypt/decrypt module for subtractive and/or additive data filtering.

* * * * *

UNITED STATES PATENT AND TRADEMARK OFFICE
CERTIFICATE OF CORRECTION

PATENT NO.    : 6,473,861 B1
DATED         : October 29, 2002
INVENTOR(S)   : Richard A. Stokes It is certified that error appears in the above-identified patent and that said Letters Patent is hereby corrected as shown below:

<u>Column 10,</u>
Line 17, "receive" should read -- receiving --

Signed and Sealed this

Eighteenth Day of March, 2003

JAMES E. ROGAN
*Director of the United States Patent and Trademark Office*